US012620760B2

(12) United States Patent
Park

(10) Patent No.: US 12,620,760 B2
(45) Date of Patent: May 5, 2026

(54) ELECTRIC CONNECTOR

(71) Applicant: Hirose Korea Co., Ltd., Siheung-si (KR)

(72) Inventor: Sang Gi Park, Siheung-si (KR)

(73) Assignee: Hirose Korea Co., Ltd., Siheung-si (KR)

( * ) Notice: Subject to any disclaimer, the term of this patent is extended or adjusted under 35 U.S.C. 154(b) by 236 days.

(21) Appl. No.: 18/235,948

(22) Filed: Aug. 21, 2023

(65) Prior Publication Data

US 2024/0063583 A1 Feb. 22, 2024

(30) Foreign Application Priority Data

Aug. 19, 2022 (KR) ........................ 10-2022-0104168

(51) Int. Cl.
*H01R 13/648* (2006.01)
*H01R 12/71* (2011.01)
*H01R 13/658* (2011.01)

(52) U.S. Cl.
CPC ......... *H01R 13/658* (2013.01); *H01R 12/716* (2013.01)

(58) Field of Classification Search
CPC ........................... H01R 13/658; H01R 12/716; H01R 13/6581; H01R 12/73; H01R 12/57
See application file for complete search history.

(56) References Cited

U.S. PATENT DOCUMENTS

2006/0040557 A1* 2/2006 Yamaguchi ........ H01R 13/6583 439/607.17
2006/0063432 A1* 3/2006 Chen .................... H01R 13/658 439/607.36
2008/0254682 A1* 10/2008 Nickol .................. H01R 24/40 439/607.01
2009/0170372 A1* 7/2009 Wang ................... H01R 13/658 439/607.23
2012/0257369 A1* 10/2012 Zhao .................... H05K 9/0016 174/351
2015/0207256 A1* 7/2015 Wu ...................... H01R 12/712 439/660
2020/0220307 A1* 7/2020 Sunaga .............. H01R 13/6591
2020/0343660 A1* 10/2020 Gondo .................. H01R 12/57
2021/0098943 A1* 4/2021 Hayashi ............. H01R 13/6594
2021/0119386 A1* 4/2021 Lee ...................... H01R 12/716

* cited by examiner

*Primary Examiner* — Abdullah A Riyami
*Assistant Examiner* — Nelson R. Burgos-Guntin
(74) *Attorney, Agent, or Firm* — IP Attorneys Group, LLC

(57) ABSTRACT

Disclosed herein is an electrical connector (10) mounted on a substrate and connected to a mating connector (20). The electrical connector (10) includes: a housing including a base, a first wall (10-5-W1) protruding from an upper surface of the base and extending in a longitudinal direction of the electrical connector (10), and a second wall (10-5-W2) protruding from the upper surface of the base and facing the first wall (10-5-W1); multiple contacts (10-3) disposed on the first wall (10-5-W1) and the second wall (10-5-W2); and a shielding part (10-S) formed around a periphery of the housing (10-5). The shielding part (10-S) has a curved portion (10-S-C) formed at an upper end of a side surface thereof and curved inwards in a transverse direction (Y-axis direction) of the electrical connector (10) and an inclined portion (10-S-I) formed inside the curved portion (10-S-C) in the transverse direction of the electrical connector (10) and adjoining the curved portion (10-S-C).

4 Claims, 11 Drawing Sheets

ELECTRIC CONNECTOR

TECHNICAL FIELD

The present invention relates to an electrical connector. More particularly, the present invention relates to an electrical connector for radio frequency (RF) applications, which includes a shielding part for electric field shielding.

BACKGROUND

Generally, interconnection between substrates is established using two connectors that are connected to respective substrates by soldering or the like and are connectable to each other. Here, one of the two connectors is a plug connector and the other is a socket connector. The socket connector is also referred to as a receptacle connector. Such plug and socket connectors may be formed by disposing terminals in a molded part (housing). The plug connector and the socket connector may be fastened to each other to form an electrical connector assembly.

With the trend toward miniaturization of electronic devices, such connectors have increasingly become compact in size and height. However, there are certain limitations in making a connector compact in size and height by reducing a pitch between electrical terminals or by downsizing related components. As connectors have become compact in size, it is more difficult than before to ensure durability thereof.

In addition, with recent improvement in performance of data processing devices mounted on electronic devices, such as a measuring instrument and an audio-visual (AV) device, processing of vast amounts of data in electronic devices has become possible. Accordingly, a large amount of data is transmitted and received as electrical signals at high speed through inter-board connectors. In addition, as mobile devices, such as smartphones, have increasingly become compact in size and highly functional, there is increasing demand for high-density mounting of components, such as devices and connectors, on a printed wiring board, which is leading to miniaturization of a connector itself and reduction in pitch between terminals in the connector. Under these circumstances, there is a need for a connector that exhibits desirable RF characteristics to properly transmit RF electrical signals, achieve impedance matching between multiple terminals inside the connector, reduce disturbances, such as noise/electromagnetic waves, which can occur between the connector and an outside environment.

SUMMARY

It is one aspect of the present invention to provide an electrical connector (10) that can prevent electromagnetic waves generated during data communication from radiating outside the connector (10) and affecting other products and can block electrical noise coming in from outside the connector (10).

It is another aspect of the present invention to prevent warpage of a shielding part (10-S) of the connector (10).

It is a further aspect of the present invention to determine a positional relationship between an uppermost point of a curved portion (10-S-C) of the shielding part (10-S) and uppermost points of terminals (10-1, 10-3) of a plug connector (10) to prevent the curved portion from interfering with connection between the terminals (10-1, 10-3) of the plug connector 10 and terminals (20-1, 20-3) of a socket connector (20).

It is yet another aspect of the present invention to reduce the size of the shielding part (10-S) (size in a transverse direction (Y-axis direction) of the connector) in consideration of a formation angle ($\alpha$) of the curved portion (10-S-C).

It is yet another aspect of the present invention to secure a sufficient space around the curved portion (10-S-C) to facilitate entry of a signal terminal (20-3) of a mating connector (20) and a surrounding portion thereof (for example, an outer wall) while securing a space for formation of an inclined portion (10-S-I) described below.

It is yet another aspect of the present invention to provide an inclined portion (10-S-I) that can prevent the connector (10) from being interfered with by a mating connector 20 upon disconnection (removal) of the connector from the mating connector and can guide the connector (10) to a correct connection position even when the connector (10) is slightly jammed while being fitted into the mating connector (20).

It is yet another aspect of the present invention to appropriately adjust a formation angle $\beta$ of the inclined portion (10-S-I) to achieve the intended effects (for example, the effects of preventing interference upon removal of the connector from the mating connector, guiding a housing (20-5) near the power terminal (20-1) of the socket connector (20) to a proper position upon connection of the connector to the mating connector, and providing sufficient rigidity to prevent warpage of the shielding part (10-S)).

It should be understood that aspects of the present invention are not limited to the above. The above and other aspects of the present invention will become apparent to those skilled in the art from the detailed description of the following embodiments in conjunction with the accompanying drawings.

In accordance with an aspect of the present invention, there is provided an electrical connector mounted on a substrate and connected to a mating connector, wherein the electrical connector includes: a housing including a base, a first wall protruding from an upper surface of the base and extending in a longitudinal direction of the electrical connector, and a second wall protruding from the upper surface of the base and facing the first wall; multiple contacts disposed on the first wall and the second wall; and a shielding part formed around a periphery of the housing, wherein the shielding part has a curved portion formed at an upper end of a side surface thereof and curved inwards in a transverse direction of the electrical connector and an inclined portion formed inside the curved portion in the transverse direction of the electrical connector and adjoining the curved portion.

A formation angle of the curved portion may be in the range of 60° to 80°, wherein the formation angle of the curved portion is an angle from a starting point of the curved portion to an uppermost point of the curved portion, as measured along a curvature of the curved portion.

Each of the curved portion and the inclined portion extends in the longitudinal direction of the electrical connector across a region in which the contacts are arranged.

With the electrical connector completely fitted into the mating connector, a formation angle of the inclined portion may be in the range of 40° and 75°, wherein the formation angle of the inclined portion is an angle of the inclined portion with respect to a sidewall of the mating connector closest to the inclined portion.

An uppermost point of the inclined portion may be located below an uppermost point of the contact.

The shielding part (10-S) according to the present invention can prevent electromagnetic waves generated during data communication from radiating outside the connector (10) and affecting other products while blocking electrical noise coming in from outside the connector (10).

Due to the curved portion (10-S-C) formed by rounding the upper end of the shielding part (10-S), the connector (10) according to the present invention can prevent warpage of the shielding part (10-S). As a comparative example, if the shielding part (10-S) only extends vertically without having the curved portion (10-S-C), the shielding part (10-S) is prone to warpage, resulting in deformation of the overall shape of the connector and thus poor connection between the terminals. By way of a non-limiting example, the shielding part (10-S) may be manufactured by drawing. The shielding part 10-S manufactured by drawing is more prone to warpage.

Preferably, there is a height difference of d (see FIG. 8) between an uppermost point of the signal terminal (10-3) and an uppermost point of the curved portion (10-S-C) (that is, a rounded distal end of the shielding part (10-S)). That is, the uppermost point of the signal terminal (10-3) is located a distance d above the uppermost point of the curved portion (10-S-C). Considering the connection state between the connectors (10, 20) shown in FIG. 9 and FIG. 10 described below, it is a priority to connect the signal terminals (10-3, 20-3) to each other or to connect the power terminals (10-1, 20-1) to each other. If the uppermost point of the curved portion (10-S-C) is located above the uppermost points of the terminals (10-1, 10-3) in FIG. 7 (for reference, if the uppermost point of the curved portion (10-S-C) is located below the uppermost points of the terminals (10-1, 10-3) in FIG. 9 and FIG. 10 showing the plug connector (10) in an "upside-down position"), this can somewhat interfere with connection between the terminals (10-1, 10-3) of the plug connector (10) and the terminals (20-1, 20-3) of the socket connector (20). Accordingly, it is desirable that the uppermost point of the signal terminal (10-3) and the uppermost point of the curved portion (10-S-C) have a height difference of d therebetween (that the uppermost point of the signal terminal (10-3) be located a distance d above the uppermost point of the curved portion (10-S-C) in FIG. 7).

Basically, since the shielding part (10-S) has the curved portion (10-S-C) rather than only extending straight upwards, the shielding part (10-S) can be prevented from warping and thus can have improved rigidity.

When a formation angle (α) of the curved portion (10-S-C) is in the range of 60° to 80°, it is possible to reduce the size of the shielding part (10-S) (size in the transverse direction (Y-axis direction) of the connector) (as compared with when the formation angle (α) is 90°).

Furthermore, when the formation angle (α) of the curved portion (10-S-C) is in the range of 60° to 80°, it is possible to secure a sufficient space to facilitate entry of the signal terminal (20-3) of the mating connector (20) and a surrounding portion thereof (for example, an outer wall) while securing a space for formation of the inclined portion (10-S-I).

Referring to FIG. 9, the signal terminal (20-3) and a surrounding portion thereof (for example, a portion of the housing (20-5)) are placed inside the plug connector (10) (in the transverse direction of the plug connector). The inclined portion (10-S-I) can guide the plug connector (10) to a correct connection position even when the plug connector (10) is slightly jammed while being fitted into the socket connector.

When the formation angle (β) of the inclined portion (10-S-I) is in the range of 40° to 75°, the inclined portion (10-S-I) can achieve the intended effects (for example, the effects of preventing interference upon disconnection (removal) of the connector from the mating connector, guiding a housing (20-5) near the power terminal (20-1) of the socket connector (20) to a proper position upon connection of the connector to the mating connector, and providing sufficient rigidity to prevent warpage of the shielding part (10-5)). It will be understood that the inclined portion (10-S-I) can provide the intended effects described above even when the angle β is adjusted to the range of 45 to 65°, 50 to 60°, or 50 to 55°, depending on the entry angle of the connector upon fitting of the connector into the mating connector, the magnitude of force applied to the connector, and the like.

It should be understood that advantageous effects of the present invention are not limited to the above. The above and other advantageous effects of the present invention will become apparent to those skilled in the art from the detailed description of the following embodiments in conjunction with the accompanying drawings.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Figure 1:
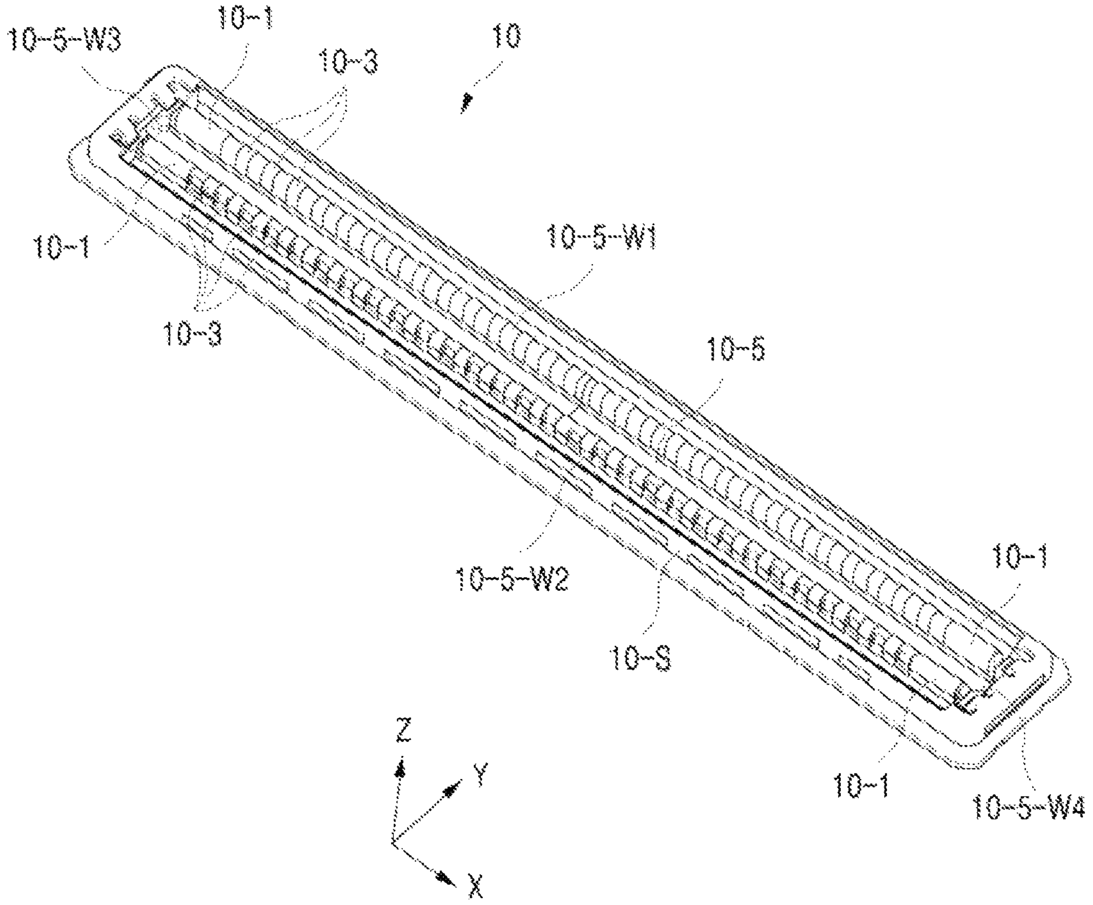
FIG. 1 is an exemplary view of a plug connector (10) among electrical connectors according to the present invention.

Hereinafter, embodiments of the present invention will be described with reference to the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims and equivalents thereto. Like components will be denoted by like reference numerals throughout the specification.

FIG. 1 is an exemplary view of a plug connector 10 among electrical connectors according to the present invention.

FIG. 1 shows, for example, a power terminal 10-1, a signal terminal 10-3, and a housing 10-5 (a molded part) of the plug connector 10. The power terminal 10-1 may also be referred to as a "fitting" 10-1 and the signal terminal 10-3 may also be referred to as a "contact" 10-3.

The power terminal 10-1 is a metal structure for reinforcement of the connector 10 and allows input/output of electrical signals. The signal terminal 10-3 allows input/output of data signals.

However, this is merely an example and the present invention is not limited thereto. For example, the power terminal 10-1 may be formed with a fitting and a power terminal separate from each other.

For example, the signal terminal 10-3 may include four pins capable of carrying a current of 0.3 A, or may be a terminal capable of carrying a current of greater than 0.3 A, for example, a current of up to 5 A, to function as a power terminal. Although the signal terminal is described as including four pins, this is merely an example and the signal terminal may include two rows of 28 pins, that is, a total of 56 pins (see FIG. 1).

The housing 10-5 has a base. The housing 10-5 has a wall protruding from an upper surface of the base and adapted for the power terminal 10-1, the signal terminal 10-3, and the like to be formed thereon.

For example, the wall includes two walls, that is, a first wall 10-5-W1 protruding from the upper surface of the base and extending in a longitudinal direction of the connector 10 and a second wall 10-5-W2 parallel to the first wall.

However, this is merely an example and the wall may include four walls. For example, the wall may include a first wall 10-5-W1 protruding from the upper surface of the base, a third wall 10-5-W3 protruding from the upper surface of the base and crossing the first wall, a second wall 10-5-W2 protruding from the upper surface, crossing the third wall, and facing the first wall, and a fourth wall 10-5-W4 protruding from the upper surface of the base, crossing the first and second walls, and facing the third wall.

The housing 10-5 (molded part) of the plug connector 10 may be formed of a plastic material, for example, a liquid crystal polymer (LCP). Alternatively, the housing 10-5 may be formed of an insulator, such as a resin and an epoxy, without being limited thereto. The power terminal 10-1 and the signal terminal 10-3 of the plug connector 10 may be formed of a metal, for example, copper or a copper alloy plated with gold (a nickel underlayer), without being limited thereto.

In addition, the plug connector 10 includes a shielding part 10-S (also referred to as a "shield") surrounding a periphery of the housing 10-5.

As mobile devices, such as smartphones, have increasingly become compact in size and highly functional, there is increasing demand for high-density mounting of components, such as a device and a connector, on a printed wiring board, which is leading to miniaturization of a connector itself and reduction in pitch between terminals in the connector. In this regard, high speed transmission of vast amounts of data as electrical signals through the connector 10 connecting such substrates to each other can cause various electromagnetic disturbances. The shielding part 10-S serves to prevent these problems. With the shielding part 10-S, the connector 10 can have desirable RF characteristics to ensure proper transmission of RF electrical signals, achieve impedance matching between multiple terminals, reduce disturbances, such as noise/electromagnetic waves, that can occur between the connector and an outside environment.

In other words, the shielding part 10-S prevents electromagnetic waves generated during data communication from radiating outside the connector 10 and affecting other products and blocks electrical noise coming in from outside the connector 10.

The shielding part 10-S is formed of a conductive material, such as a metal.

The specific structure and shape of the shielding part 10-S according to the present invention will be described further below.

Figure 2:
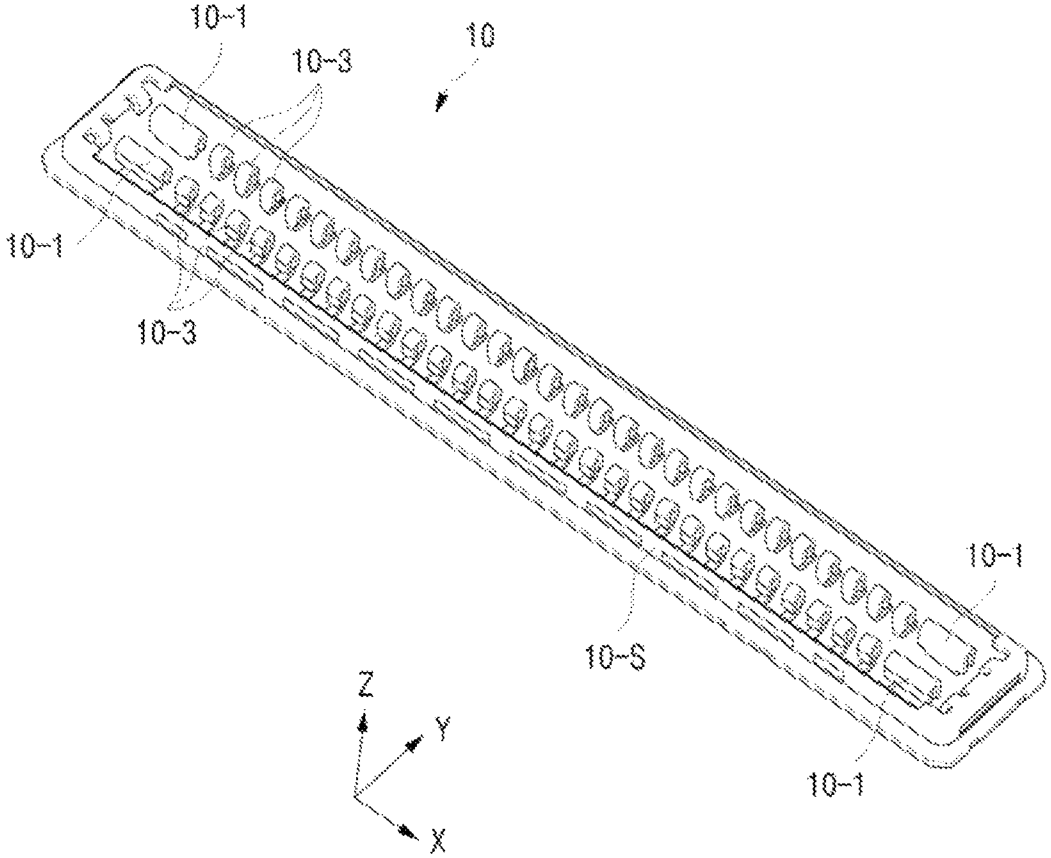
FIG. 2 is a view of the plug connector (10) of FIG. 1, with a housing (10-5) removed therefrom.

FIG. 2 is a view of the plug connector 10 of FIG. 1, with the housing 10-5 removed therefrom.

FIG. 2 shows the shielding part 10-S surrounding the periphery of the housing 10-5 (not shown in FIG. 2) and the power terminal 10-1 and the signal terminal 10-3 coupled to the housing 10-5.

For reference, although a power terminal 10-1 in the upper left corner of the drawing is shown as two separate pieces, it will be understood that the present invention is not limited thereto and the two pieces constituting the power terminal 10-1 may be connected to each other on the short wall side. Similarly, although a power terminal 10-1 in the lower right corner of the drawing is shown as two separate pieces, it will be understood that the present invention is not limited thereto and the two pieces constituting the power terminal 10-1 may be connected to each other on the short wall side.

Figure 3:
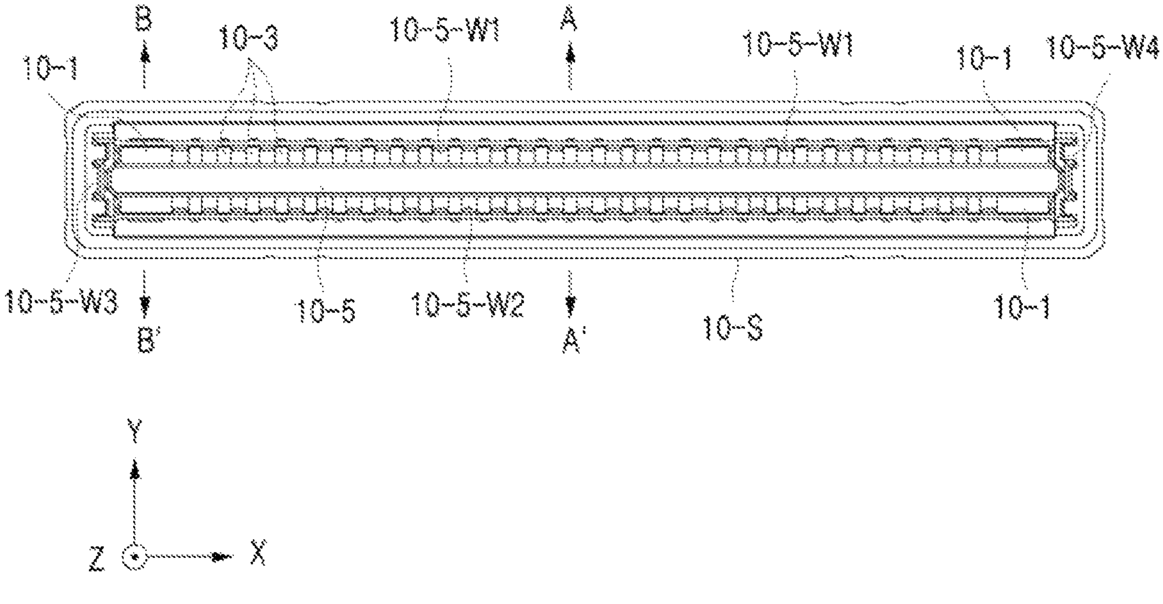
FIG. 3 is a top view of the plug connector (10) of FIG. 1.

FIG. 3 is a top view of the plug connector 10 of FIG. 1.

FIG. 3 shows the power terminal 10-1, the signal terminal 10-3, the housing 10-5, and the shielding part 10-S, wherein line A-A' and line B-B' indicate the locations of sectional views described below.

Figure 4:
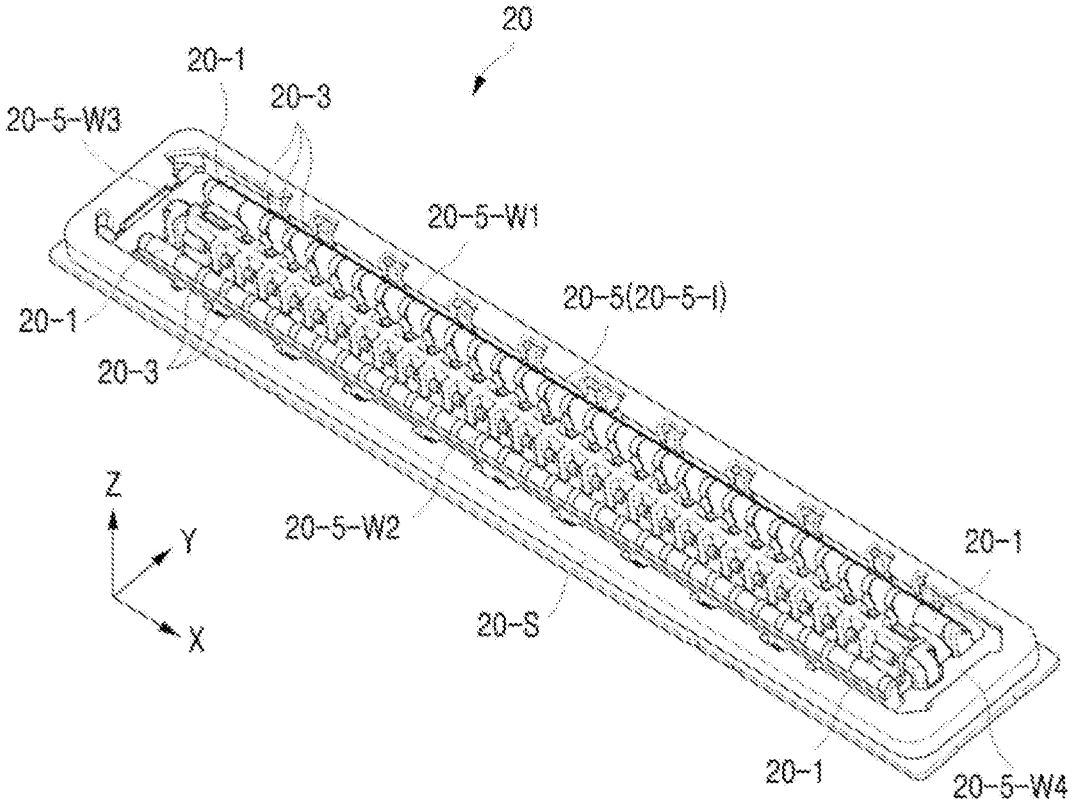
FIG. 4 is a view of a socket connector (20) mated with the plug connector (10) of FIG. 1.

FIG. 4 illustrates a socket connector 20 mated with the plug connector 10 of FIG. 1.

The plug connector 10 of FIG. 1 is fitted into the socket connector 20 of FIG. 4. The socket connector 20 may also be referred to as a receptacle connector 20.

FIG. 4 shows a power terminal 20-1 formed at both ends of the socket connector 20 and two rows of multiple contacts 20-3 arranged at predetermined intervals between the power terminals.

The power terminal 20-1 of the socket connector 20 is fitted into the power terminal 10-1 of the plug connector 10 (see FIG. 1 to FIG. 3) and the signal terminal 20-3 of the socket connector 20 is fitted into the signal terminal 10-3 of the plug connector 10 (see FIG. 1 to FIG. 3).

The socket connector 20 includes a wall forming a portion of a housing 20-5. Although a first wall 20-5-W1 and a second wall 20-5-W2 are prominently shown in FIG. 4, a third wall 20-5-W3 and a fourth wall 20-5-W4 may also be present, as needed.

Each of the first wall 20-5-W1 and the second wall 20-5-W2 extends in a longitudinal direction (X-axis direction) of the connector 20. The first wall 20-5-W1 and the second wall 20-5-W2 face each other.

Each of the third wall 20-5-W3 and the fourth wall 20-5-W4 extends in a transverse direction (Y-axis direction) of the connector 20. The third wall 20-5-W3 and the fourth wall 20-5-W4 face each other.

The first to fourth walls are connected to one another in a sequence of the first wall 20-5-W1/the third wall 20-5-W3/the second wall 20-5-W2/the fourth wall 20-5-W4/the first wall 20-5-W1. The third wall 20-5-W3 and the fourth wall 20-5-W4 (perpendicular to the first wall 20-5-W1 and the second wall 20-5-W2) may be omitted if desired.

Further, as a portion of the housing 20-5, an island portion 20-5-I is formed at a center of the socket connector 20.

Figure 5:
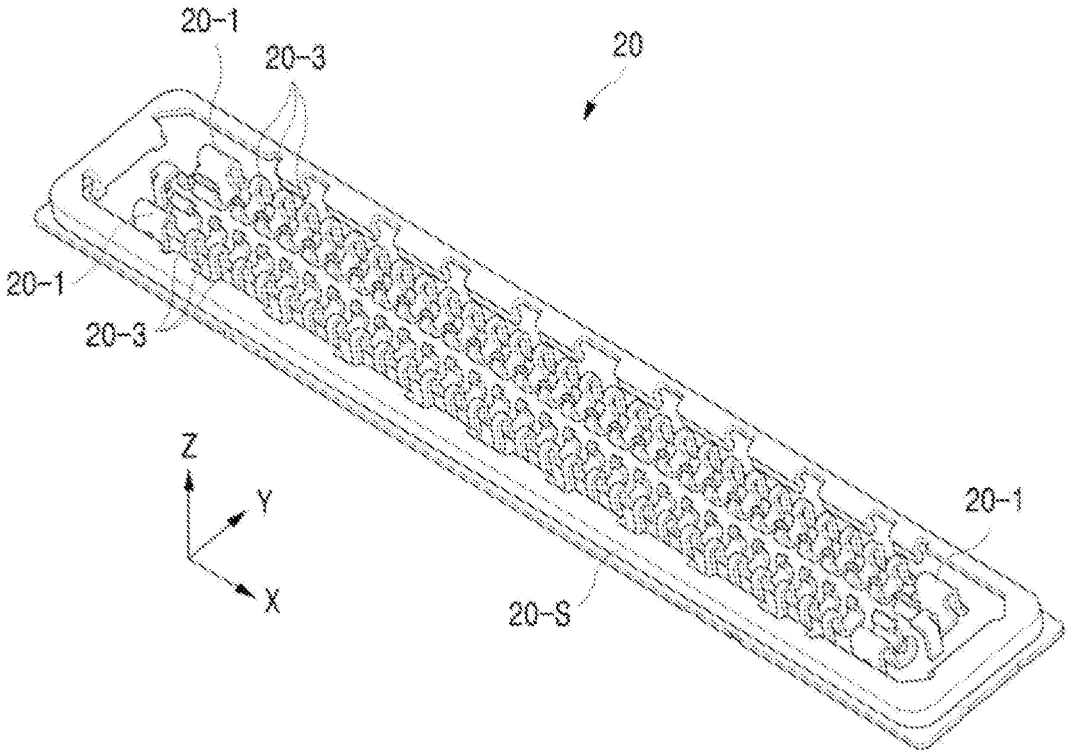
FIG. 5 is a view of the socket connector (20) of FIG. 4, with a housing (20-5) removed therefrom.

FIG. 5 is a view of the socket connector of FIG. 4, with the housing 20-5 removed therefrom.

Unlike the power terminal 10-1 in the upper left corner of FIG. 2, which is shown as two pieces, the power terminal 20-1 in the upper left corner of FIG. 5 is shown as one piece. However, this is merely an example and the present invention is not limited thereto.

FIG. 5 shows: a shielding part 20-S surrounding the periphery of the housing 20-5 (not shown in FIG. 5) and the power terminal 20-1 and the signal terminal 20-3 coupled to the housing 20-5.

The shielding part 20-S has a similar function to the shielding part 10-S of the plug connector 10.

Figure 6:
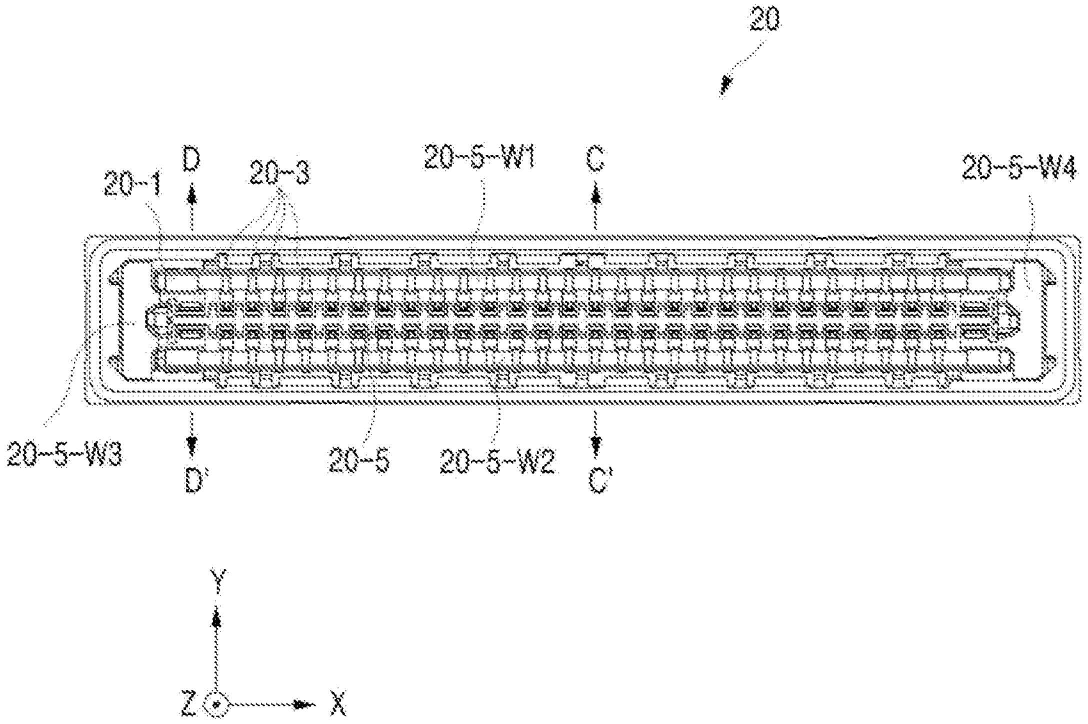
FIG. 6 is a top view of the socket connector (20) of FIG. 4.

FIG. 6 is a top view of the socket connector 20 of FIG. 4.

FIG. 6 shows the power terminal 20-1, the signal terminal 20-3, the housing 20-5, and the shielding part 20-S, wherein line C-C' and line D-D' indicate the locations of sectional views described below.

For reference, in terms of location, line C-C' of the socket connector 20 corresponds to line A-A' of the plug connector 10 and line D-D' of the socket connector 20 corresponds to line B-B' of the plug connector 10.

Figure 7:
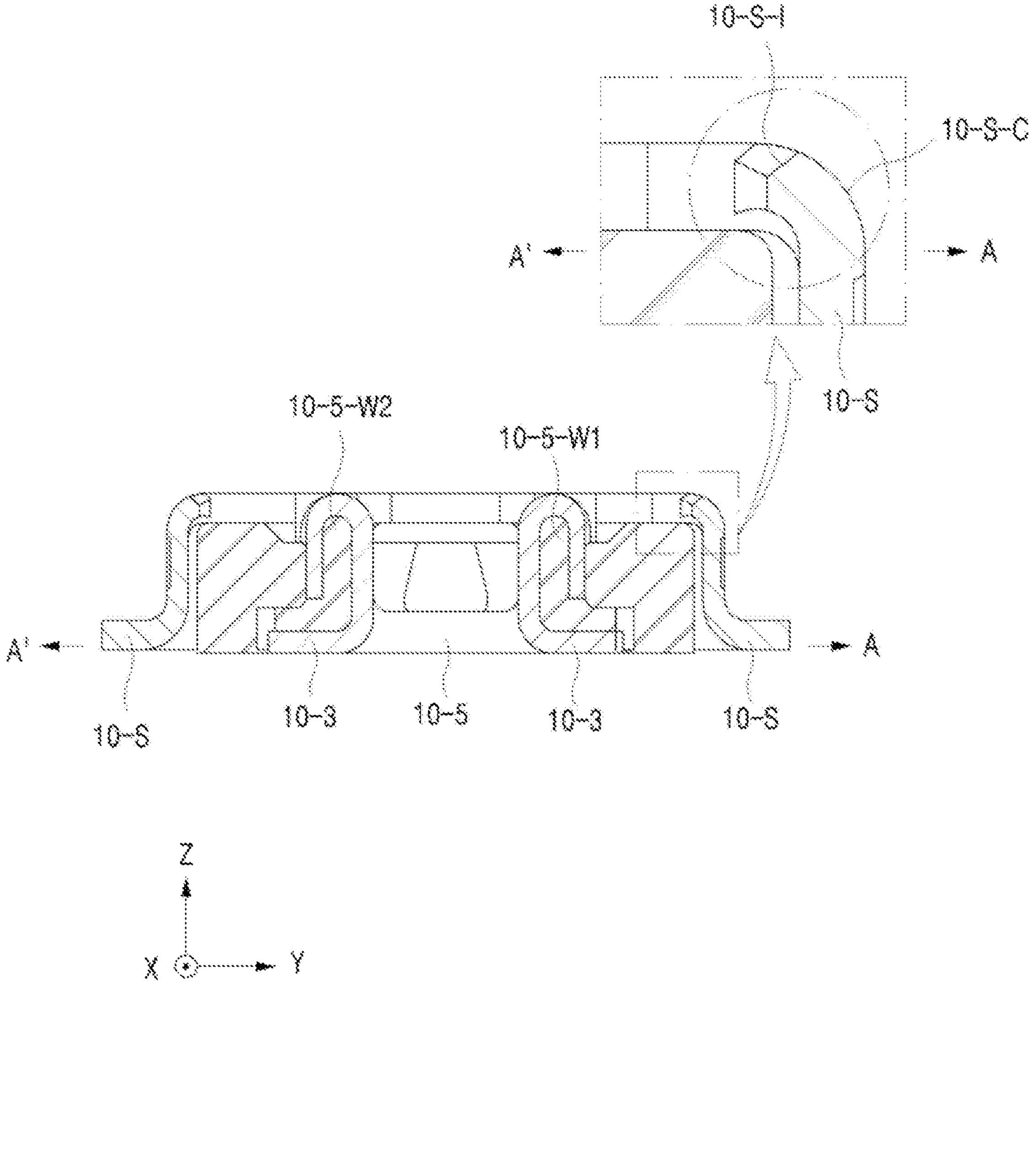
FIG. 7 is a sectional view taken along line A-A' of FIG. 3.

FIG. 7 is a sectional view of FIG. 3 taken along line A-A'.

Referring to FIG. 7, a section of the shielding part 10-S is located outside a section of the signal terminal 10-3.

The shielding part 10-S is rounded at an upper end thereof. That is, the shielding part 10-S not only extends upwards, but is also curved inwards (in the transverse direction of the connector 10) at the upper end thereof to form a curved portion 10-S-C. An apex of the curved portion 10-S-C is located slightly below the overall height of the connector 10. The curved portion 10-S-C meets an inclined portion 10-S-I at the apex thereof and is gradually inclined inwards in the transverse direction of the connector 10.

Each of the curved portion 10-S-C and the inclined portion 10-S-I extends in the longitudinal direction (X-axis direction) of the electrical connector (the plug connector 10) at least over a region in which the contacts (the signal terminals 10-3) are arranged.

Although FIG. 7 shows only one section obtained by cutting the connector 10 in the transverse direction (Y-axis direction) thereof, the same section will be obtained no matter where the connector 10 is cut, so long as the signal terminal 10-3 is disposed at the location.

By way of a non-limiting example, referring to FIG. 3, in a section obtained by cutting the connector 10 at any location where the power terminal 10-1 or the signal terminal 10-3 is disposed, the curved portion 10-S-C formed at an angle $\alpha$ in the range described below (see FIG. 8) and the inclined portion 10-S-I formed at an angle $\beta$ in the range described below (see FIG. 11) can be seen.

Figure 8:
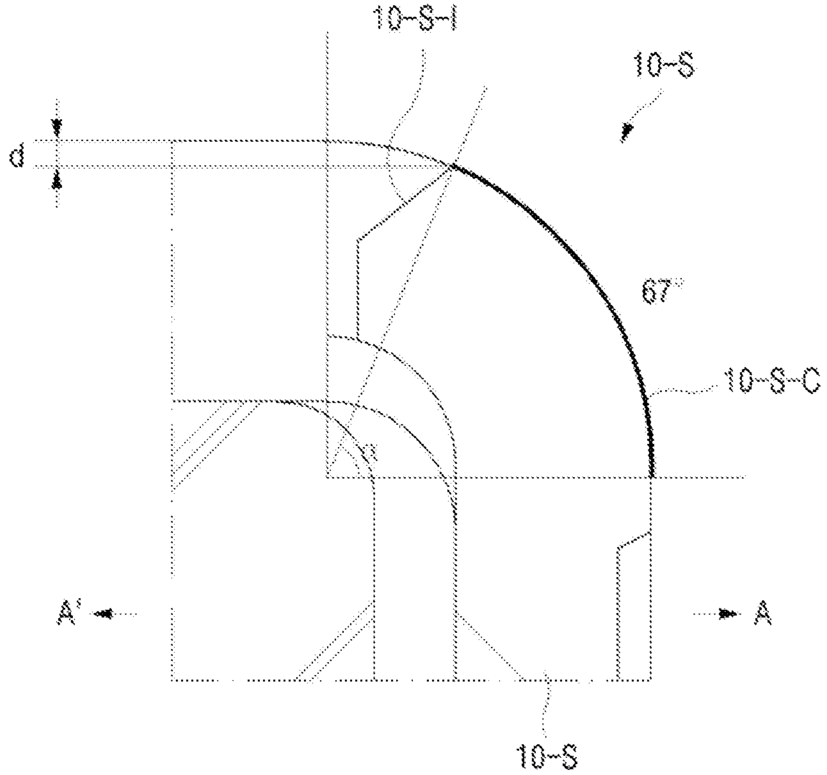
FIG. 8 is a partially enlarged view of FIG. 7.

FIG. 8 is a partially enlarged view of FIG. 7.

Specifically, FIG. 8 illustrates an enlarged view of the circled region of FIG. 7.

Due to the curved portion 10-S-C formed by rounding the upper end of the shielding part 10-S, the connector according to the present invention can prevent warpage of the shielding part 10-S. As a comparative example, if the shielding part 10-S only extends vertically without having the curved portion 10-S-C, the shielding part 10-S is prone to warpage, resulting in deformation of the overall shape of the connector and thus poor connection between the terminals. By way of a non-limiting example, the shielding part 10-S may be manufactured by drawing. The shielding part 10-S manufactured by drawing is more prone to warpage.

In the connector according to the present invention, the shielding part 10-S has a rounded shape at the distal end thereof. In particular, the shielding part 10-S may have a rounded shape without having a straight section at least across a region parallel to the first wall 10-5-W1. The same is applied to a region of the shielding part 10-S parallel to the second wall 10-5-W2.

That is, the curved portion 10-S-C may be continuously formed along the first wall 10-5-W1 and the second wall 10-5-W2 on which the signal terminals 10-3 are arranged, rather than formed only at one point in section A-A', to have a sectional shape as shown in FIG. 7.

More preferably, the rounded shape (the curved portion 10-S-C) extends not only across a region where the signal terminals 10-3 are arranged, but also across a region where the power terminals 10-1 are disposed (that is, across both the region where the signal terminals 10-3 are arranged and the region where the power terminals 10-1 are disposed).

Figure 9:
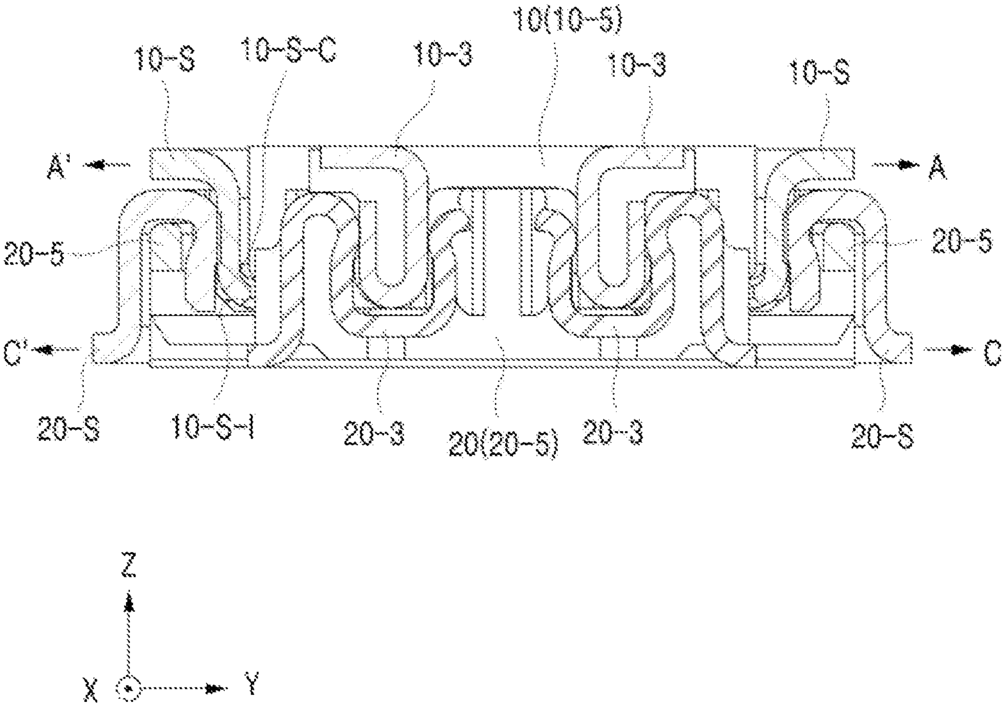
FIG. 9 is a sectional view illustrating connection between the plug connector (10) of FIG. 1 and the socket connector (20) of FIG. 4.
Figure 10:
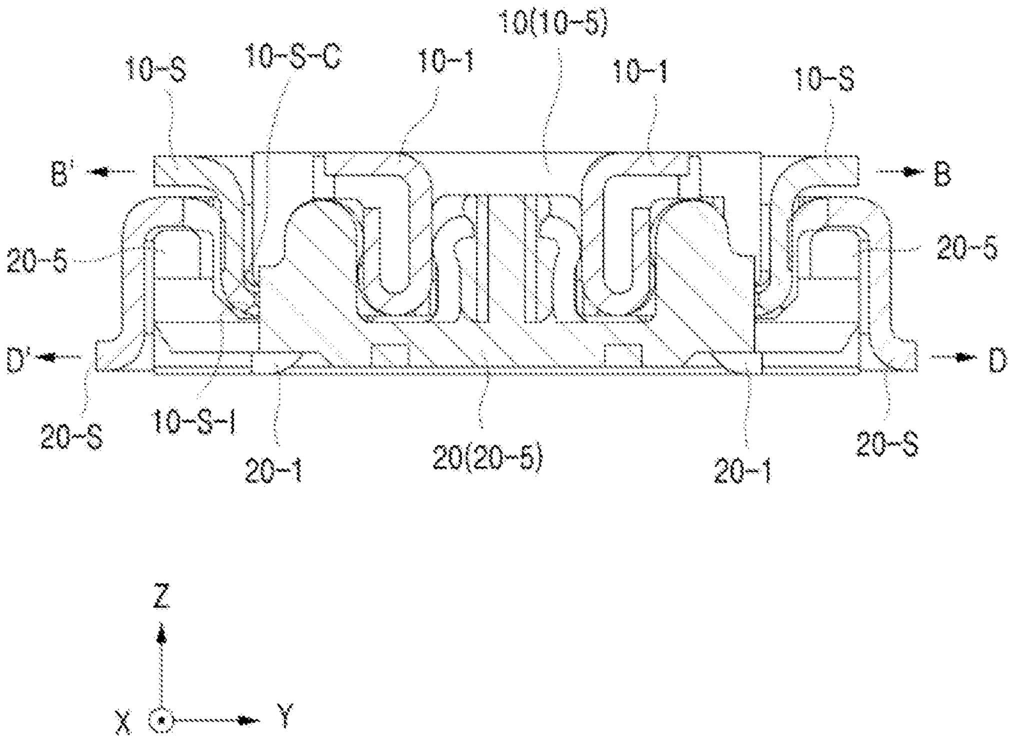
FIG. 10 is a sectional view illustrating connection between the plug connector (10) of FIG. 1 and the socket connector (20) of FIG. 4.

There may be a height difference of d between an uppermost point of the signal terminal 10-3 and an uppermost point of the curved portion 10-S-C (that is, the rounded distal end of the shielding part 10-S), as shown in FIG. 8. That is, the uppermost point of the signal terminal 10-3 may be located a distance d above the uppermost point of the curved portion 10-S-C. Considering the connection state between the connectors 10, 20 shown in FIG. 9 and FIG. 10 described below, it is a priority to connect the signal terminals 10-3, 20-3 to each other or to connect the power terminals 10-1, 20-1 to each other. If the uppermost point of the curved portion 10-S-C is located above the uppermost points of the terminals 10-1, 10-3 in FIG. 7 (if the uppermost point of the curved portion 10-S-C is located below the uppermost points of the terminals 10-1, 10-3 in FIG. 9 and FIG. 10 showing the plug connector 10 in an "upside-down position"), this can somewhat interfere with connection between the terminals 10-1, 10-3 of the plug connector 10 and the terminals 20-1, 20-3 of the socket connector 20. Accordingly, it is desirable that the uppermost point of the signal terminal 10-3 and the uppermost point of the curved portion 10-S-C have a height difference of d therebetween (that the uppermost point of the signal terminal 10-3 be located a distance d above the uppermost point of the curved portion 10-S-C).

Basically, since the shielding part 10-S has the curved portion 10-S-C rather than only extending straight upwards, the shielding part 10-S can be prevented from warping and thus can have improved rigidity.

In addition, in terms of an angle $\alpha$ of the uppermost point of the curved portion 10-S-C with respect to the ground (see FIG. 8), the curved portion may extend up to a certain point in the middle of the shielding part 10-S, rather than extending to a point forming an angle of 90° with respect to the ground. For example, a formation angle $\alpha$ of the curved portion (the angle of the uppermost point of the curved portion 10-S-C with respect to the ground) may be in the range of 60° to 80°.

As used herein, the "formation angle $\alpha$" is defined as an angle formed between a point at which a straight sidewall of the shielding part 10-S ends and the curved portion 10-S-C starts and the uppermost point of the curved portion 10-S-C, as measured along the curvature of the curved portion 10-S-C. Preferably, the formation angle $\alpha$ is measured with respect to the center point of the radius of curvature. Although the formation angle $\alpha$ may be measured irrespective of a precise radius of curvature depending on the situation (the curve of the curved portion), it is desirable to measure the formation angle $\alpha$ along the curvature for convenience and accuracy of measurement.

The formation angle of the curved portion 10-S-C may be in the range of 65° to 70°. More specifically, the formation angle of the curved portion 10-S-C may be about 67°. When the formation angle α is in the range of 60° to 80°, it is possible to reduce the size of the shielding part 10-S (size in the transverse direction (Y-axis direction) of the connector) (as compared with when the formation angle is 90°), thereby reducing the overall width of the connector 10.

In addition, when the formation angle α is in the range of 60° to 80°, it is possible to secure a sufficient space to facilitate entry of the signal terminal 20-3 of a mating connector 20 and a surrounding portion thereof (for example, an outer wall) while securing a space for formation of the inclined portion 10-S-I described below.

A formation angle β of the inclined portion 10-S-I may also be set within a predetermined range, which will be described be further below with reference to FIG. 11.

FIG. 9 is a sectional view illustrating connection between the plug connector 10 of FIG. 1 and the socket connector 20 of FIG. 4.

In FIG. 9, the socket connector 20 is in the position shown in FIG. 4 and the plug connector 10 is fitted into the socket connector 20 after being turned upside down with respect to the position shown in FIG. 1.

For reference, although a centermost portion of the signal terminal 20-3 of the socket connector 20 has a slight inward bend due to contact with the signal terminal 10-3 of the plug connector 10, the bend is omitted for convenience of illustration.

Here, the sectional view of FIG. 9 is taken along line A-A' of FIG. 3 (the plug connector 10) and line C-C' of FIG. 6 (the socket connector 20).

Referring to FIG. 9, the signal terminal 20-3 and a surrounding portion thereof (for example, a portion of the housing 20-5) are placed inside the plug connector 10 (in the transverse direction of the plug connector).

For example, upon disconnection (removal) of the connector 10 from the mating connector 20, the inclined portion 10-S-I can prevent the connector 10 from being interfered with by the mating connector. In addition, upon connection of the connector 10 to the mating connector 20, the inclined portion 10-S-I can guide the connector 10 to a correct connection position, even when the connector 10 is slightly jammed while being fitted into the mating connector 20. In preventing interference upon removal of the connector 10 from the mating connector 20 or guiding the connector 10 to a correct connection position upon connection of the connector 10 to the mating connector 20, the formation angle β of the inclined portion 10-S-I is also important, which will be discussed below with reference to FIG. 11.

The inclined portion 10-S-I also serves to provide sufficient rigidity to prevent warpage of the shielding part 10-S in cooperation with the curved portion 10-S-C.

FIG. 10 is a sectional view illustrating connection between the plug connector 10 of FIG. 1 and the socket connector 20 of FIG. 4.

In FIG. 10, the socket connector 20 is in the position shown in FIG. 4 and the plug connector 10 is fitted into the socket connector 20 after being turned upside down with respect to the position shown in FIG. 1.

For reference, although a centermost portion of the power terminal 20-3 of the socket connector 20 has a slight inward bend due to contact with the power terminal 10-3 of the plug connector 10, the bend is omitted for convenience of illustration.

Here, the sectional view of FIG. 10 is taken along line B-B' of FIG. 3 (the plug connector 10) and line D-D' of FIG. 6 (the socket connector 20).

Referring to FIG. 10, the power terminal 20-3 and a surrounding portion thereof (for example, a portion of the housing 20-5) are placed inside the plug connector 10 (in the transverse direction of the plug connector). The inclined portion 10-S-I can guide the plug connector 10 to a correct connection position even when the plug connector 10 is slightly jammed while being fitted into the socket connector 20. In this regard, as described in FIG. 9, the formation angle of the inclined portion 10-S-I is also important, which will be discussed below with reference to FIG. 11.

Figure 11:
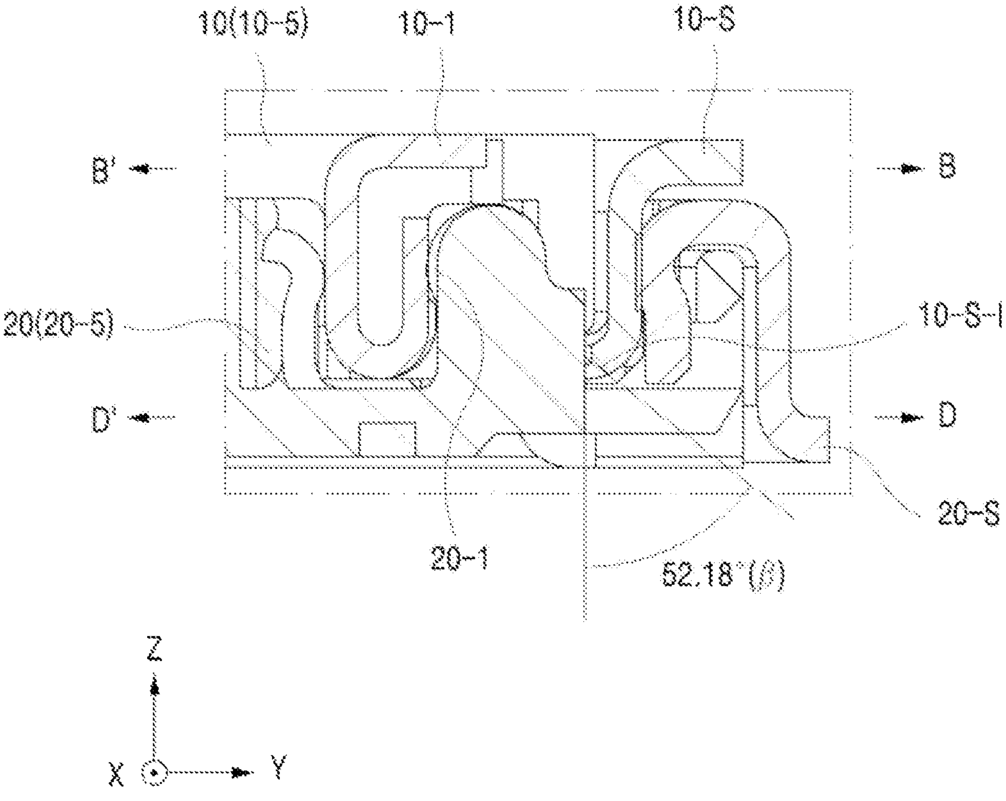
FIG. 11 is a partially enlarged view of FIG. 10.

FIG. 11 is a partially enlarged view of FIG. 10.

In FIG. 11, an angle β formed between the inclined portion 10-S-I and the other member is shown.

Although FIG. 11 is a partially enlarged view of FIG. 10, the positions of the two connectors of FIG. 11 may correspond to those of FIG. 9.

Referring to FIG. 11, with the plug connector 10 fitted into the socket connector 20, an angle β at which the inclined portion 10-S-I of the shielding part 10-S of the plug connector 10 meets the housing 20-5 near the power terminal 20-1 of the socket connector 20 is, for example, 52.18°, as indicated by the line of the drawing. In other words, when fitting of the plug connector 10 into the socket connector 20 is completed, the outer wall of the socket connector is placed at an angle to the round-shaped portion (the curved portion 10-S-C). Here, an angle at which the inclined portion 10-S-I meets the outer wall of the terminal 20-1 or 20-3 of the socket connector 20 is denoted as β.

However, 52.18° is merely an example and the present invention is not limited thereto. When the angle β is in the range of 40° to 75°, the inclined portion 10-S-I can achieve the intended effects described above (for example, the effects of preventing the connector 10 from being interfered with by the mating connector 20 upon disconnection (removal) of the connector 10 from the mating connector, guiding the housing 20-5 near the power terminal 20-1 of the socket connector 20 to a proper position upon connection of the plug connector 10 to the socket connector 20, and providing sufficient rigidity to prevent warpage of the shielding part 10-S). It will be understood that the inclined portion 10-S-I can provide the intended effects even when the angle β is adjusted to the range of 45 to 65°, 50 to 60°, or 50 to 55°, depending on the entry angle of the plug connector upon fitting of the plug connector into the socket connector, the magnitude of force applied to the plug connector, and the like.

In other words, with the plug connector 10 completely fitted into the socket connector 20, the "formation angle β of the inclined portion", that is, the angle formed between the inclined portion 10-S-I and a sidewall (a portion of the housing 20-5) of the socket connector 20 closest to the inclined portion 10-S-I may be in the range of 40° to 75°.

Although the embodiments described above with reference to the drawings illustrate that the curved portion 10-S-C and the inclined portion 10-S-I are applied to the shielding part 10-S of the plug connector 10, the present invention is not limited thereto and the curved portion and the inclined portion may be applied only to the shielding part 20-S of the socket connector 20, or may be applied to both the shielding part 10-S of the plug connector 10 and the shielding part 20-S of the socket connector 20, as needed.

Although some embodiments have been described herein in conjunction with the accompanying drawings, it should be understood that the present invention is not limited to the embodiments and may be embodied in different ways, and that various modifications, changes, alterations, and equivalent embodiments can be made by those skilled in the art without departing from the spirit and scope of the invention. Therefore, it should be understood that the foregoing embodiments are provided for illustration only and are not to be in any way construed as limiting the present invention.

LIST OF REFERENCE NUMERALS

10: Plug connector
10-1: Fitting (for example, power terminal)
10-3: Contact (for example, signal terminal)
10-5: Housing (molded part)
10-5-W1: First wall
10-5-W2: Second wall
10-5-W3: Third wall
10-5-W4: Fourth wall
10-S: Shielding part
10-S-C: Curved portion
10-S-I: Inclined portion
20: Socket connector (receptacle connector)
20-1: Fitting (for example, power terminal)
20-3: Contact (for example, signal terminal)
20-5: Housing (molded part)
20-5-W1: First wall
20-5-W2: Second wall
20-5-W3: Third wall
20-5-W4: Fourth wall
20-5-I: Island portion
20-S: Shielding part

The invention claimed is:

1. An electrical connector mounted on a substrate and connected to a mating connector, the electrical connector comprising:

a housing comprising a base, a first wall protruding from an upper surface of the base and extending in a longitudinal direction of the electrical connector, and a second wall protruding from the upper surface of the base and facing the first wall;

multiple contacts disposed on the first wall and the second wall; and a shielding part formed around a periphery of the housing, wherein the shielding part has a curved portion formed at an upper end of a side surface thereof and curved inwards in a transverse direction of the electrical connector and an inclined portion formed inside the curved portion in the transverse direction of the electrical connector and adjoining the curved portion;

wherein each of the curved portion and the inclined portion extends in the longitudinal direction of the electrical connector across a region in which the contacts are arranged.

2. The electrical connector according to claim 1, wherein a formation angle of the curved portion is in the range of 60° to 80°, the formation angle of the curved portion being an angle from a starting point of the curved portion to an uppermost point of the curved portion, as measured along a curvature of the curved portion.

3. The electrical connector according to claim 1, wherein, with the electrical connector completely fitted into the mating connector, a formation angle of the inclined portion is in the range of 40° to 75°, the formation angle of the inclined portion being an angle of the inclined portion with respect to a sidewall of the mating connector closest to the inclined portion.

4. The electrical connector according to claim 1, wherein an uppermost point of the inclined portion is located below an uppermost point of the contact.

* * * * *